(12) United States Patent
Whittaker

(10) Patent No.: US 8,122,074 B2
(45) Date of Patent: Feb. 21, 2012

(54) DIGITAL ELECTRONIC BINARY ROTATOR AND REVERSER

(75) Inventor: James Robert Whittaker, Hertfordshire (GB)

(73) Assignee: Imagination Technologies Limited, Kings Langley, Hertfordshire (GB)

( * ) Notice: Subject to any disclaimer, the term of this patent is extended or adjusted under 35 U.S.C. 154(b) by 1114 days.

(21) Appl. No.: 11/977,729

(22) Filed: Oct. 25, 2007

(65) Prior Publication Data

US 2008/0104155 A1    May 1, 2008

(30) Foreign Application Priority Data

Oct. 30, 2006  (GB) .................................. 0621602.2

(51) Int. Cl.
*G06F 15/00* (2006.01)
(52) U.S. Cl. ....................................................... 708/209
(58) Field of Classification Search .................... 708/209
See application file for complete search history.

(56) References Cited

U.S. PATENT DOCUMENTS

| | | | | |
|---|---|---|---|---|
| 4,829,460 A | * | 5/1989 | Ito ................................ | 708/209 |
| 5,262,971 A | * | 11/1993 | Yamaguchi ................... | 708/209 |
| 5,477,543 A | | 12/1995 | Purcell | |
| 5,682,340 A | * | 10/1997 | Arends et al. ................. | 708/209 |
| 5,987,603 A | * | 11/1999 | Shah ............................. | 712/300 |
| 5,991,786 A | | 11/1999 | Mahurin | |
| 6,098,087 A | | 8/2000 | Lemay | |
| 6,622,242 B1 | | 9/2003 | Steele, Jr. | |
| 6,675,182 B1 | | 1/2004 | Hofstee et al. | |
| 2006/0248134 A1 | * | 11/2006 | Gupta et al. .................. | 708/209 |

FOREIGN PATENT DOCUMENTS

| | | |
|---|---|---|
| EP | 0 264 130 | 4/1988 |
| EP | 0 757 312 | 2/1997 |
| GB | 2 370 384 | 6/2002 |

* cited by examiner

*Primary Examiner* — Chuong D Ngo
(74) *Attorney, Agent, or Firm* — Flynn, Thiel, Boutell & Tanis, P.C.

(57) ABSTRACT

A binary rotator which includes an array of n cascaded 2-input multiplexer banks and received at an input $2^n$-bit binary data words can be used not only for rotation but also for selective reversal, without the necessity of the addition of a further multiplex bank dedicated to the reversal. This is achieved by making groups of multiplexers of at least all but one of the n banks of multiplexers separately controllable by words from control logic, rather than feeding the multiplexer banks with single control bits. The control bits are appropriately selected to provide the desired rotation-cum-reversal with just the $2^n \times n$ array of multiplexers, and can themselves be generated by appropriate logic gates.

21 Claims, 15 Drawing Sheets

(a)

(b)

DIGITAL ELECTRONIC BINARY ROTATOR AND REVERSER

FIELD OF THE INVENTION

This invention relates to a digital electronic binary rotator and reverser of the type which is used in processors to rotate or shift, and to reverse, the bits of a $2^n$ bit digital binary data word, and to a method of rotating or shifting, and reversing, the bits of a $2^n$ bit binary data word.

BACKGROUND OF THE INVENTION

A schematic diagram of a binary rotator is shown in FIG. 1. This type of arrangement is known as a logarithmic rotator. The rotator 100 shown is for handling 16-bit words and has 16 inputs 102 and an array of 16 by 4 multiplexer units 104 connected as shown. There are 16 outputs 106 connected to the multiplexer outputs. The multiplexers are connected by possible paths shown in dashed lines, the actual connections that are operative at any moment being shown in heavy lines.

On the left hand side of FIG. 1 are the input bits of the binary number, bits 0 to 15. It is common in digital electronics to shift or to rotate the bits of a binary number for many different reasons and therefore these types of rotators are frequently provided.

The logarithmic rotator of FIG. 1 is implemented using a plurality of two-input or 2:1 multiplexer units. One of these is shown in more detail with reference to FIG. 2. In this, the unit has a pair of inputs A and B, an output C, and a control input S. The control input receives a logical 0 or a logical 1, and this determines the switching which takes place in the multiplexer to switch either the input from A or the input from B to the output C. Thus, when the control bit is a logical 0 input A is passed to the output C, as shown at (a) in FIG. 2, and when the control input is a logical 1, input B is switched to the output C, as shown at (b) in FIG. 2. For most of the multiplexers the output C is delivered to two subsequent multiplexers, and this is indicated at C1 and C2, though there are only 3 independent signal terminals.

Reverting to FIG. 1, it is seen that the multiplexers are in four banks. Starting from the input end, as shown, 16 multiplexers 104a receive at their A inputs a respective one of the inputs 102. At their inputs B they receive respectively the one of the inputs which is displaced by 8 input positions or bits from the input connected to their A input. Thus the first multiplexer 104a0 is connected to the 0 and 8 bit inputs, multiplexer 104a1 is connected to the 1 and 9 bit inputs, and so on to multiplexer 104a7 which is connected to the 7 and 15 bit inputs. Multiplexer 104a8 is then connected to the 8 and 0 inputs at its inputs A and B respectively, and this continues until finally multiplexer 104a15 is connected to the 15 and 7 bit inputs.

In the next bank 104b, the multiplexers are connected to the outputs of the multiplexers of the first bank 104a. They are somewhat similarly connected to the first bank but this time the two inputs A and B of any gate are connected to bits that are 4 apart rather than 8. Conversely, each multiplexer of the first bank is connected to two multiplexers of the second bank and this is why there are two signals C1 and C2 from each previous multiplexer. In the third bank 104c the inputs of any given gate are connected to the outputs of multiplexers of the second bank that are two bits apart, and in the fourth and final bank 104d the multiplexers are each connected to adjacent multiplexers of the third bank. The connections are clearly shown on FIG. 1 as will be well understood by those skilled in the art so a full detailed description in writing of all the possible connections is not necessary.

It is seen from the foregoing that the first multiplexer bank selectively provides for a rotation by 8 bits, the next bank by 4 bits, the third bank by 2 bits, and the final bank by 1 bit. Any desired rotation of 1 to 15 bits can be made from appropriate combination of the desired multiplexer banks.

It is the sequence 8, 4, 2, 1 that gives rise to the name 'logarithmic' rotator for this type of circuit. The rotator performs rotate operations by performing rotations by fixed powers of two in cascaded stages, selecting a rotating or non-rotating condition for each stage. In general, for a $2^n$-bit input there are n banks each of $2^n$ multiplexers. The multiplexers of the first bank are connected to inputs $2^{n-1}$ input bits apart, the next to multiplexers of the first bank that are $2^{n-2}$ bits apart, and so on. The value of n will normally be 3, 4, or a larger integer.

With appropriate operation of the cascaded multiplexers, an input 16-bit number can be rotated by the circuit of FIG. 1 through any desired number of places. The way this is achieved will now be described. FIG. 1 shows the straight-through condition in which the input 102 is simply passed to the output 106 without any rotation.

Each multiplexer bank is fed a control input bit from control logic 108. The control inputs of each multiplexer of a bank are connected together; in fact the control bits are passed down the bank. The control logic 108 provides a four-bit output comprised of four control bits S3, S2, S1 and S0 in decreasing order of significance. In the FIG. 1 condition all four control bits are zero. Thus the A input of each one of the 64 multiplexers is selected.

In FIG. 1 all the four control bits are 0. If it is desired to rotate the input rather than pass it straight through, then the control bits are changed accordingly. In order to rotate by one bit, the bit S0 is changed from a 0 to a 1. To rotate by two bits, the bit S0 remains as a 0 but the control bit S1 is changed to a 1. To rotate by three bits, both control bits S0 and S1 are changed to a 1. Thus it is seen that the number of bits by which the input is to be rotated is simply set as the value represented by bits S3,S2,S1,S0.

FIG. 3 shows an example where a rotation by 5 bits is desired. Thus bits S0 and S2 are set to 1 while bits S1 and S3 remain at 0. The bits S3, S2, S1, S0 are thus binary 0101 and represent the digital value 5. Each multiplexer of the first and third banks 104a and 104c will select their A input, and each multiplexer of the second and fourth banks will select their B input. The consequential active connections are illustrated by heavy lines on FIG. 3, and it is seen that a 5-bit rotation does indeed result. More generally, using this arrangement enables an input bit to be shifted by up to fifteen logical positions within the input word. The connections along which the bits are shifted wrap around from position 0 to position 15, thereby enabling bits 0 to 15 to be shifted to any of the positions of bits 0 to 15 respectively using the appropriate control inputs to the multiplexers. A 4-bit word selects the amount of rotation to be implemented by the binary rotator.

Because the multiplexer components used in the arrangement shown in FIG. 1 are commonly available in a standard cell library, these type of rotating arrangements are relatively straightforward to design and implement and are commonly used. One example incorporating an arrangement along the lines of FIG. 1 is described in U.S. Pat. No. 5,991,786 to Mahurin.

Although the use of such circuits for effecting a rotation operation has been described above, similar arrangements can also be used to effect a shift. In this case the connections do not wrap around, but rather are terminated at the top edge of FIG. 1. To avoid undue complexity the description in this specification is given primarily in terms of rotation, but those skilled in the art will appreciate that with minor modification they can also be used for shifting operations.

Another useful operation that is frequently implemented in digital signal processing (DSP) hardware is the bit reverser function. In this, the most significant bit of an input word is exchanged with the least significant bit, the next most significant bit with the next least significant bit and so on such that the bits of the input word are reversed in the output word. When a function such as this has to be implemented continuously, all that is required is the rewiring of a data path. However, there are many applications where the bit reverse is an optional function. Thus, logical switching circuitry has to be used to enable the reversed or non-reversed form of the input word to be passed to the output. This function can be simply realised by using one column of two-input multiplexers and selecting between the bit-reversed or normal form of the bits.

FIG. 4 shows such a reverser that could be used in conjunction with a rotator if both rotation and reversing are desired as options. To reduce complexity an 8-bit input is shown (n=3) in this and the subsequent figures. The combined rotator/reverser shown in FIG. 4 includes a rotator based on FIG. 1 and is combined with a reverser formed of a further bank of two-input multiplexers 112. Each individual multiplexer 112-$i$ is connected to receive a bit i and also the bit 7-$i$. That is, the first multiplexer 112-0 is connected to receive bits 0 and 7 from the output 106 of the rotator, the next multiplexer 112-1 is connected to receive bits 1 and 6, and so on.

The multiplexer bank 112 is controlled by a further control bit SR that is 0 if no reversal is required and is 1 if reversal is required. The control logic 118 can be extended to provide the control bit SR. When the control bit SR is 0, the upper input (as shown) of each multiplexer is selected, and when the control bit is 1, the lower input is selected.

It should be noted that FIG. 4 is not taken from any prior art document known to the applicant but is an illustration of a way in which both rotation and reversal could be provided using known techniques; however European Patent Application 264 130 (Fujitsu) describes a barrel shifter based on a rotator as described above that has a reverser section connected at its input and another reverser section connected at its output.

However, such an implementation would require a large number of wire crossings converging at a single point. This may cause wiring congestion in a silicon chip and this is undesirable. It would also require an increase in the number of multiplexer banks.

U.S. Pat. No. 6,675,182 to Hofstee et al. describes a rotator based on a logarithmic rotator but optimised to enable not only a normal rotate operation but also sub-field rotations. That is, for an 8-bit signal the upper and lower 4-bit components can each be selectively rotated, or adjacent pairs of bits can be selectively rotated. To achieve this, the multiplexer banks are not connected as shown in FIG. 1, 3 or 4 and described above, but rather are connected so as to swap bits which are 4, 2 and 1 bits apart respectively. The control logic used comprises fixed logic gates that require carry inputs from one multiplexer bank to the next.

A complicated structure for shifting and reordering two input 72-bit numbers using two banks of 16 and 8 eight-input gates connected through a matrix of busses, the gates of the 16-gate bank being independently controlled, is illustrated in U.S. Pat. No. 5,477,543 to Purcell. Further, no reversal arrangment is described.

Neither these nor any other prior art known to the applicant discloses an arrangement that enables selective rotation (or shifting) and/or reversal as desired using a minimum multiplexer configuration.

SUMMARY OF THE INVENTION

The invention in its various aspects is defined, and advantageous features are set forth.

A binary rotator comprising n cascaded 2-input multiplexer banks can be used not only for rotation but also for selective reversal, without the necessity of the addition of a further multiplexer bank dedicated to the reversal. This is achieved by feeding the multiplexer banks not just with single control bits for each bank, but rather with control words appropriately selected to provide the desired rotation-cum-reversal.

Because the binary rotator is then used also for performing reversal, there is also the advantage of a saving in the propagation delay for signals to pass through the device when a rotate-and-reverse is performed. This may allow an increased clock speed for a processor using such an arrangement, thus increasing performance in comparison to an implementation using a separate row of multiplexers for bit reversal in addition to a rotator.

The invention is applicable to other configurations than the precise configuration as shown in FIG. 1. That is, the multiplexer banks do not have to be in the order illustrated. In fact there are advantages in placing them in the opposite order with the bank whose inputs are one bit apart as the first bank. Indeed other connection patterns can be used, provided that the logarithmic pattern 4, 2, 1, appears in some way. For example the structure of the multiplexer array of U.S. Pat. No. 6,675,182 could be employed (but not its control logic), with appropriately-derived control words. Although 2-input multiplexers are preferred, other 3-signal-terminal devices could in principle be used instead.

Once it is appreciated that a binary rotator comprising n cascaded 2-input multiplexer banks can be used not only for rotation but also for selective reversal, without the necessity of the addition of a further multiplexer bank dedicated to the reversal, the control words required for any given implementation can be determined empirically, or by using known software routines. Detailed examples of the control words are given below. The control words can be stored in a look-up table, addressed by the rotate and reverse control bits, such as S3-S0 and SR described above, to provide the required output of n words of $2^n$ bits, or can be generated by an appropriate arrangement of gates, or by equivalent software.

BRIEF DESCRIPTION OF THE DRAWINGS

Preferred embodiments of the invention will now be described in detail by way of example with reference to the accompanying drawings, in which.

DETAILED DESCRIPTION OF THE PREFERRED EMBODIMENTS

Figure 1:
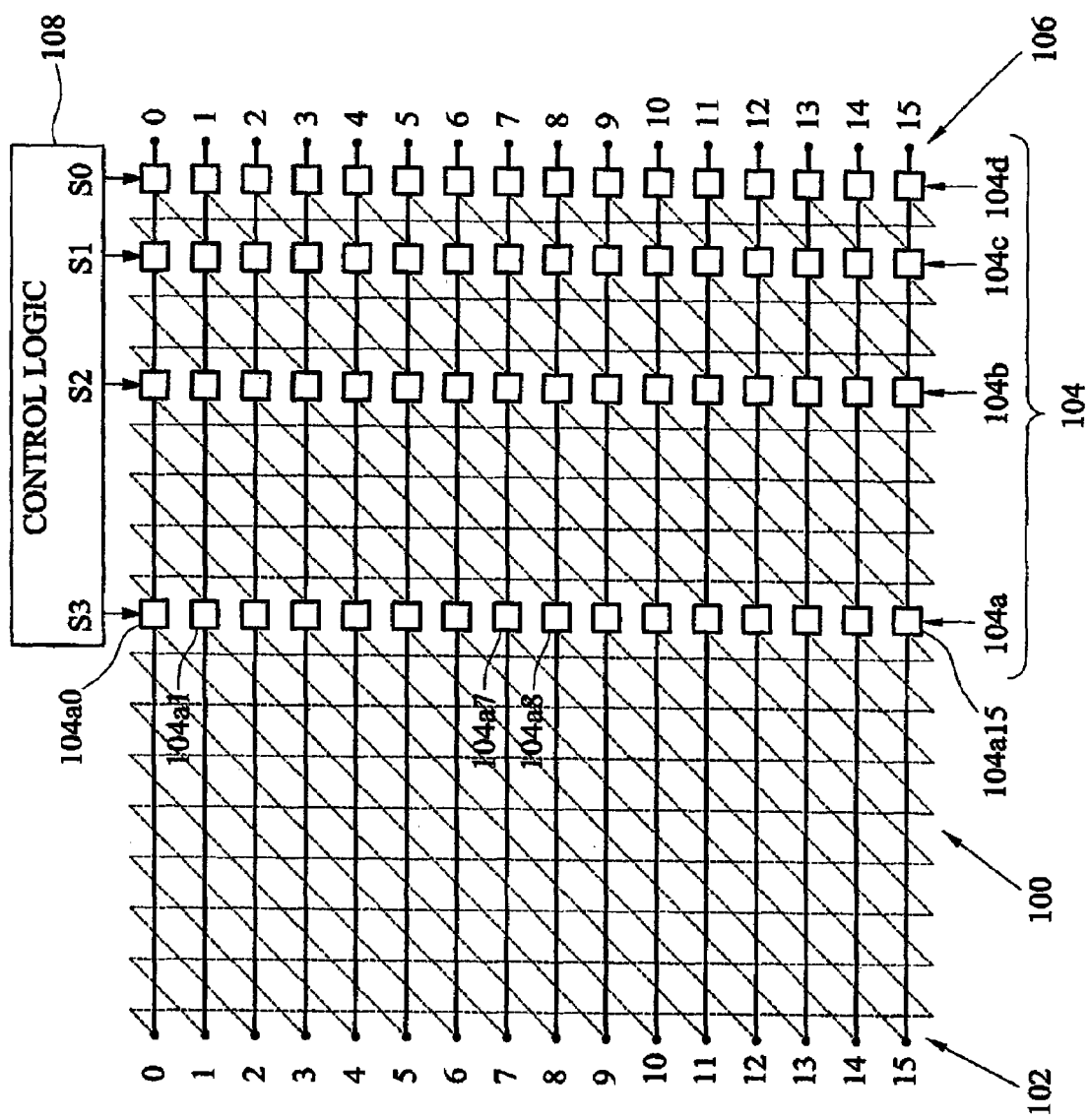
FIG. 1 is a diagram showing the construction of a known logarithmic rotator.
Figure 2:
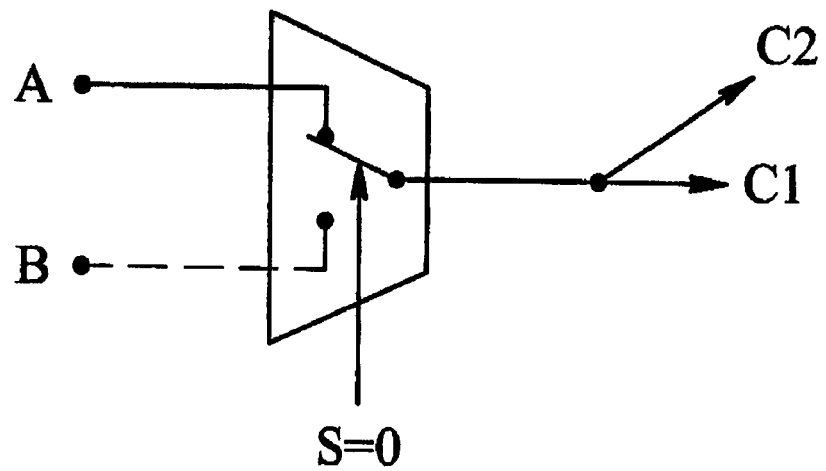
FIG. 2 illustrates at (a) and (b) one of the multiplexers used in the known circuit of FIG. 1, showing the possible connections and the actual connections dependent upon a control bit S.
Figure 2:
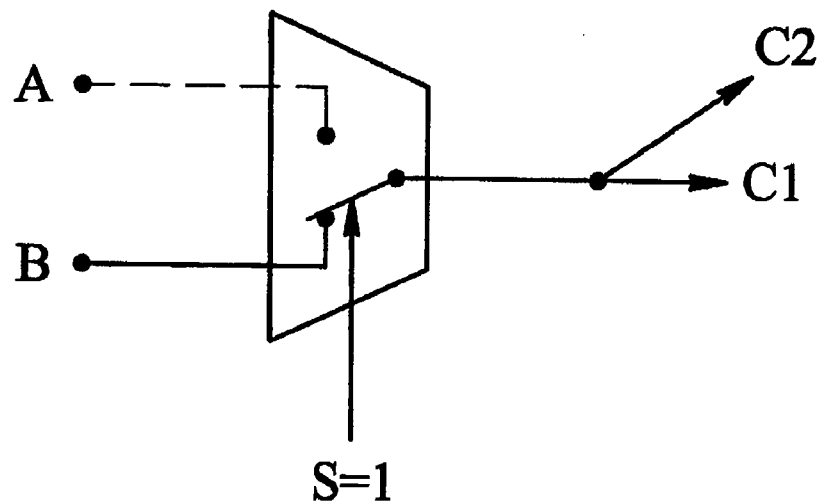
Figure 3:
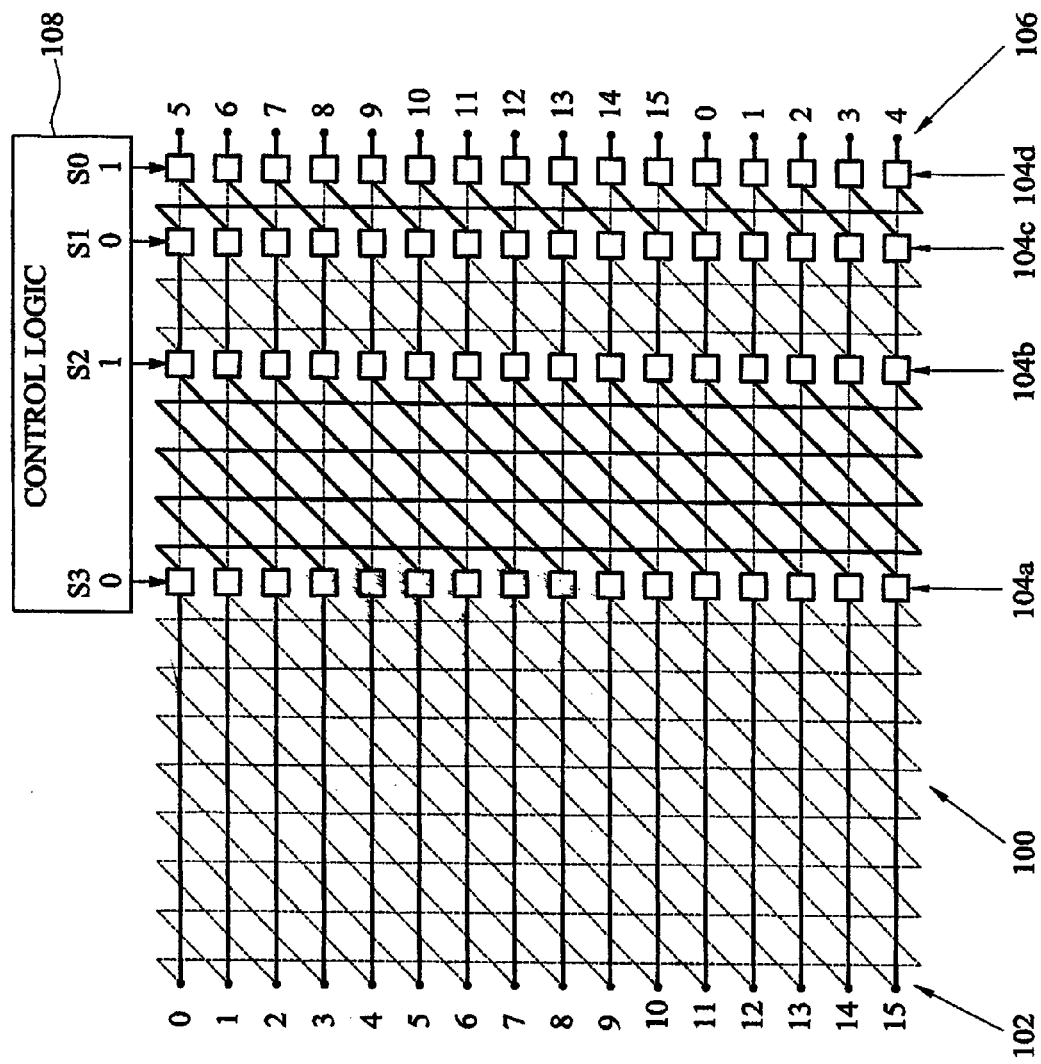
FIG. 3 shows the rotator of FIG. 1 when it is arranged to provide a rotation by five bits.

Embodiments of the invention rely on the realisation that the manipulation of the control signals to the multiplexers of a logarithmic rotator enables a bit reverse function to be selectively obtained. A complete bit reverse function is illustrated for a 16-bit rotation unit 120 with reference to FIG. 5 using an array of 4 banks each of 16 multiplexers. FIG. 5 shows the data paths followed by each of the bits to provide the desired complete bit reverse for a 16-bit input word at input 102. The basic structure of the multiplexers is as in FIGS. 1 and 3 and is not therefore described again. It is illustrated for an 8-bit rotation unit 140 with reference to FIG. 6 using an array of 3×8 multiplexers, which shows the data paths followed by each of the bits to provide a complete bit reverse for an 8-bit input word, and is a little easier to follow. The multiplexer array is similar to that of FIG. 4 but with the multiplexer bank 112 omitted. In both FIG. 5 and FIG. 6 the multiplexers are again as in FIG. 2. Each bit has a number of possible paths through the multiplexer array. The paths required in any instance are implemented by control bits applied to the multiplexers as shown in the figures.

As can be seen, to provide a bit reverse function for the gates in bank 104d, all the multiplexers have a control bit 1 applied to them. This switches the lower of the inputs (B) coming from a bit line in a higher respective position to the multiplexer to the output. On gates 104c, alternate logical 0s and logical 1s are applied to the control inputs of the multiplexers. For multiplexers 104b, alternate pairs of logical 0s and logical 1s are applied to alternate pairs of multiplexers, and for multiplexers 104a (FIG. 5 only), alternate groups of four logical 0s and four logical 1s are applied to the control gates. The logical state of the control bit is shown on FIGS. 5 and 6 written into each gate as a 0 or 1.

Considering the 16-bit implementation of FIG. 5, the effect of this arrangement of inputs is to rotate bit 15 to bit position 0 at the output 106 via the multiplexers at bit position 7 in multiplexer bank 104a, bit position 3 in multiplexer bank 104b, bit position 1 in multiplexer bank 104c, and bit position 0 at multiplexer bank 104d. All of these multiplexers have a logical 1 applied to their control inputs.

Figure 6:
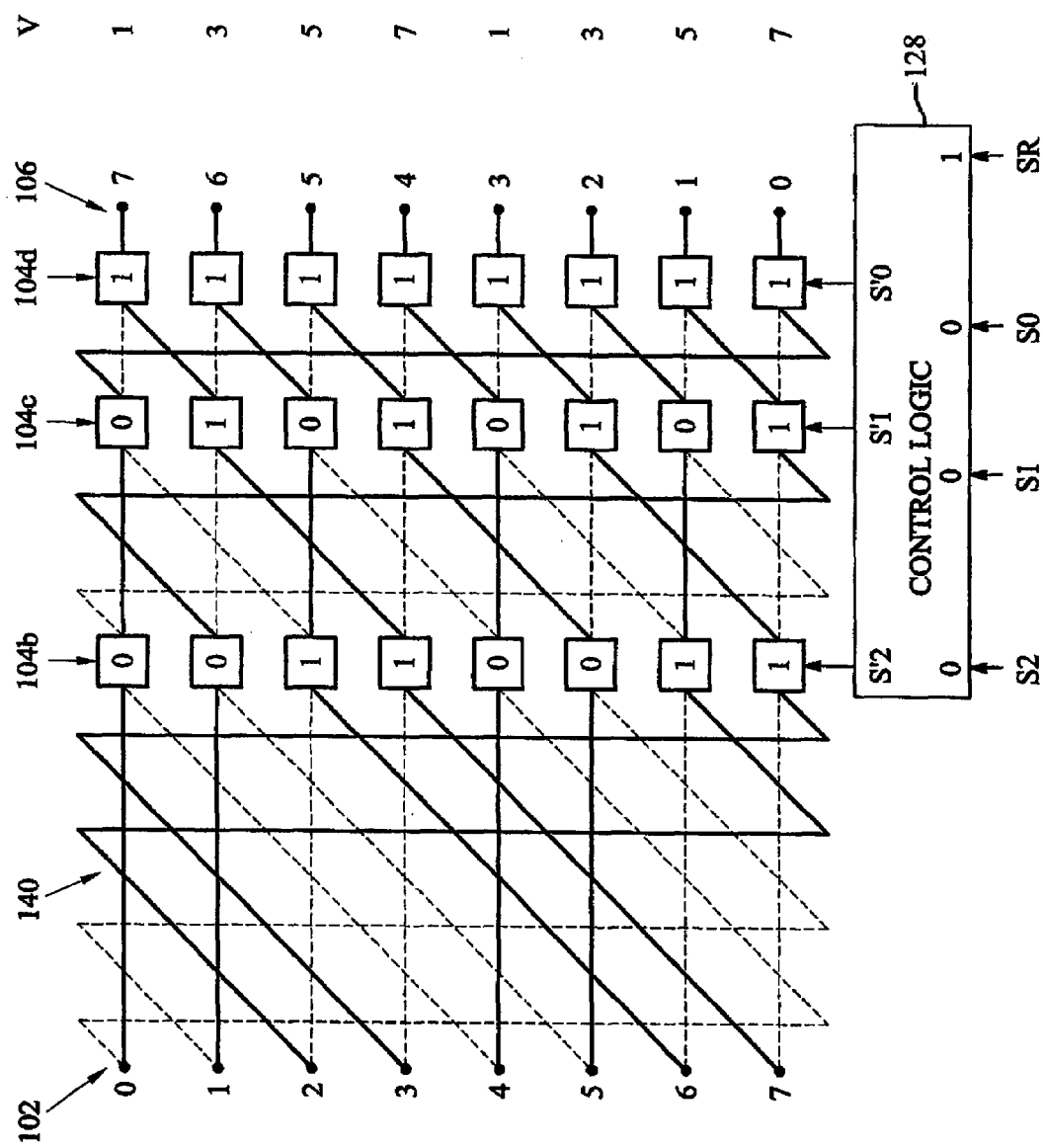
FIG. 6 illustrates a second embodiment of the invention in which an 8-bit input can be selectively rotated and reversed.

Considering the 8-bit implementation of FIG. 6, the effect is to rotate bit 7 to bit position 0 at the output 106 via the multiplexers at bit position 3 in multiplexer bank 104b, bit position 1 in multiplexer bank 104c, and bit position 0 at multiplexer bank 104d. All of these multiplexers have a logical 1 applied to their control input scores.

The other input bits at inputs 102 are routed as shown by the heavy lines so as to appear reversed at the outputs 106, as is seen from the bit numbers shown.

Figure 4:
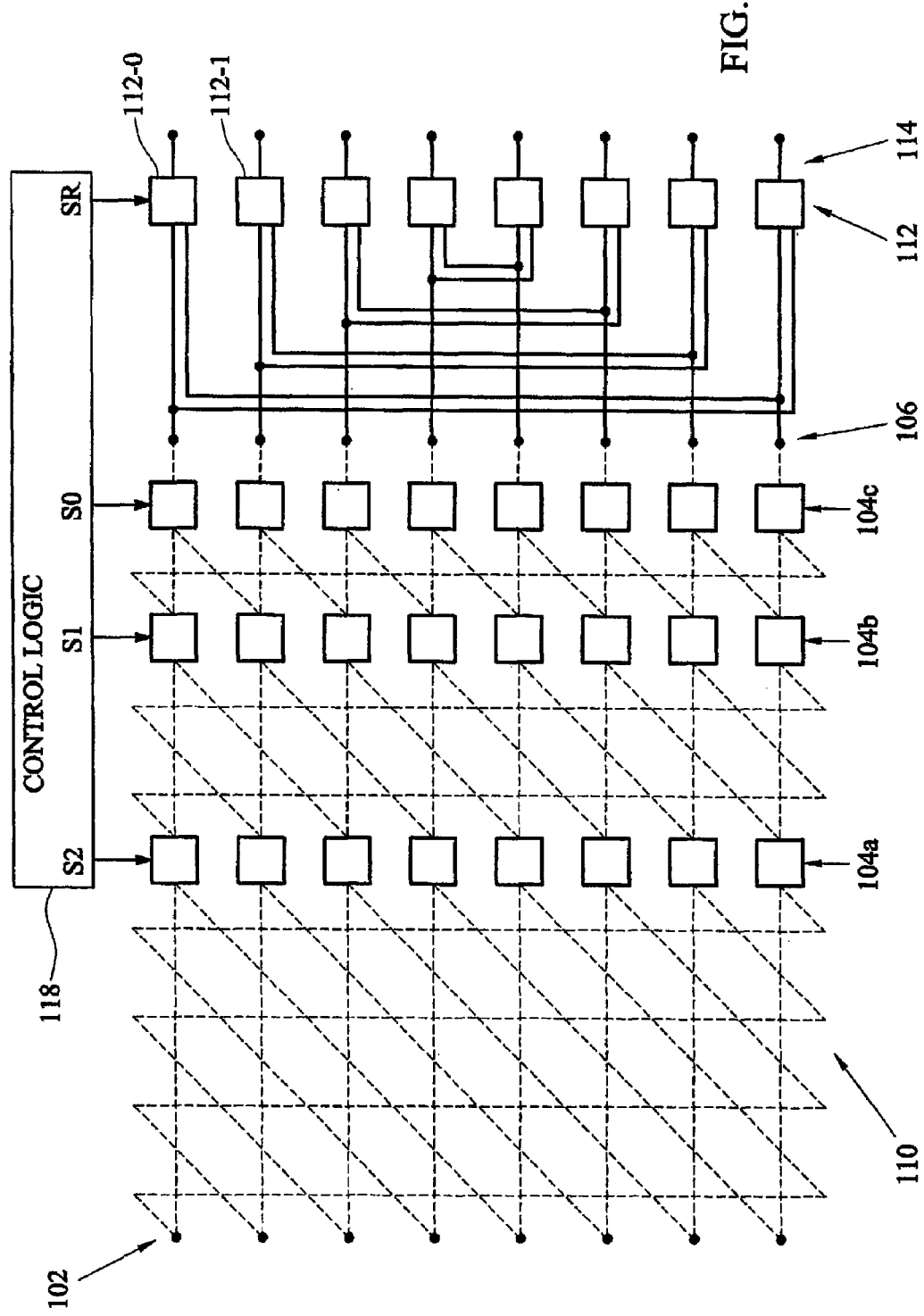
FIG. 4 shows how an 8-bit rotator of the general type shown in FIG. 1 can be combined with a bit reverser.
Figure 5:
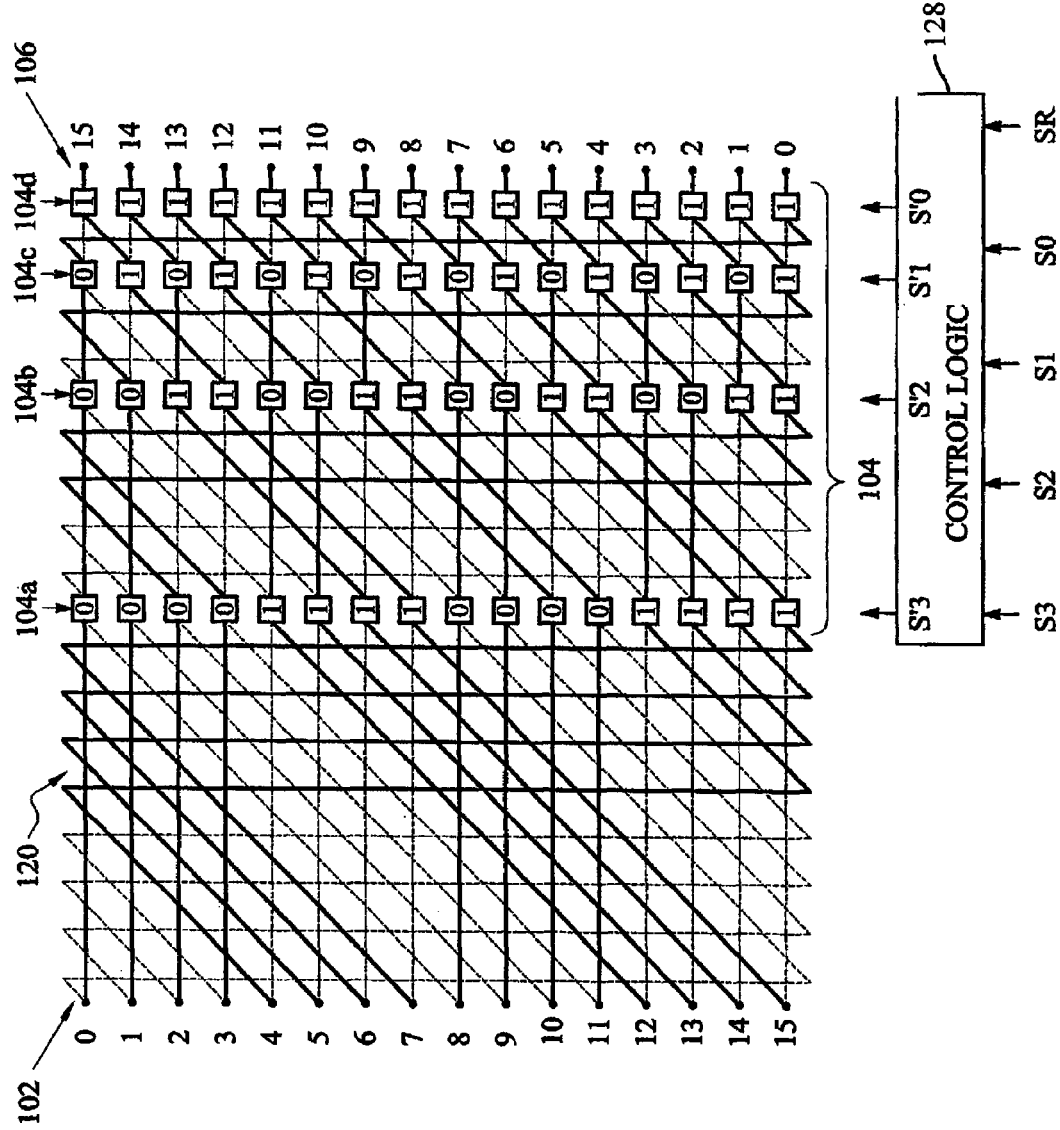
FIG. 5 illustrates a first embodiment of the invention in which a 16-bit input can be selectively rotated and reversed.

Thus the control logic 128 supplies control words S'3,S'2, S'1,S'0 in FIG. 5 or S'2,S'1,S'0 in FIG. 6 instead of the previous control bits S2,S1,S0 and SR of FIG. 4. It happens that the control signal S'1 is in fact all 0s or all 1s, so in this particular implementation is effectively one bit rather than a word. For the other banks the gates are grouped with each group controlled by its own control bit of the control word. As will be seen below, bank 104c needs S'1 to have two control bits, bank 104b needs S'2 to have four control bits, and bank 104a (FIG. 5 only) needs S'3 to have eight control bits.

Figure 7:
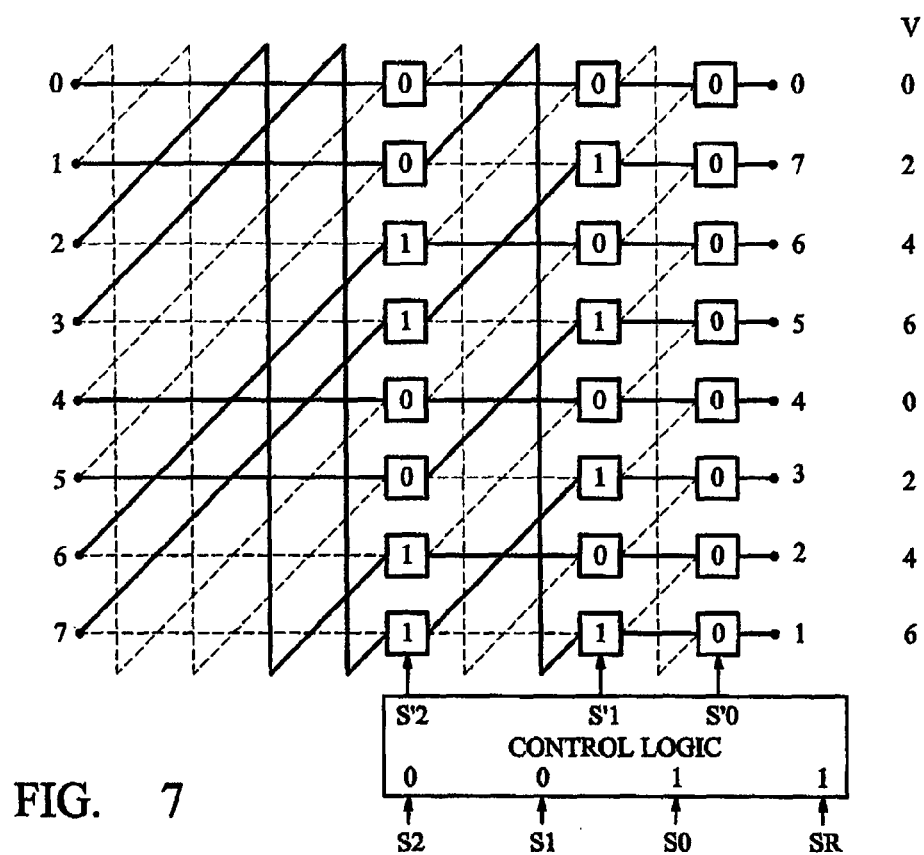
FIG. 7 shows the rotator/reverser of FIG. 6 when configured to effect a 1-bit rotate and a reverse.
Figure 8:
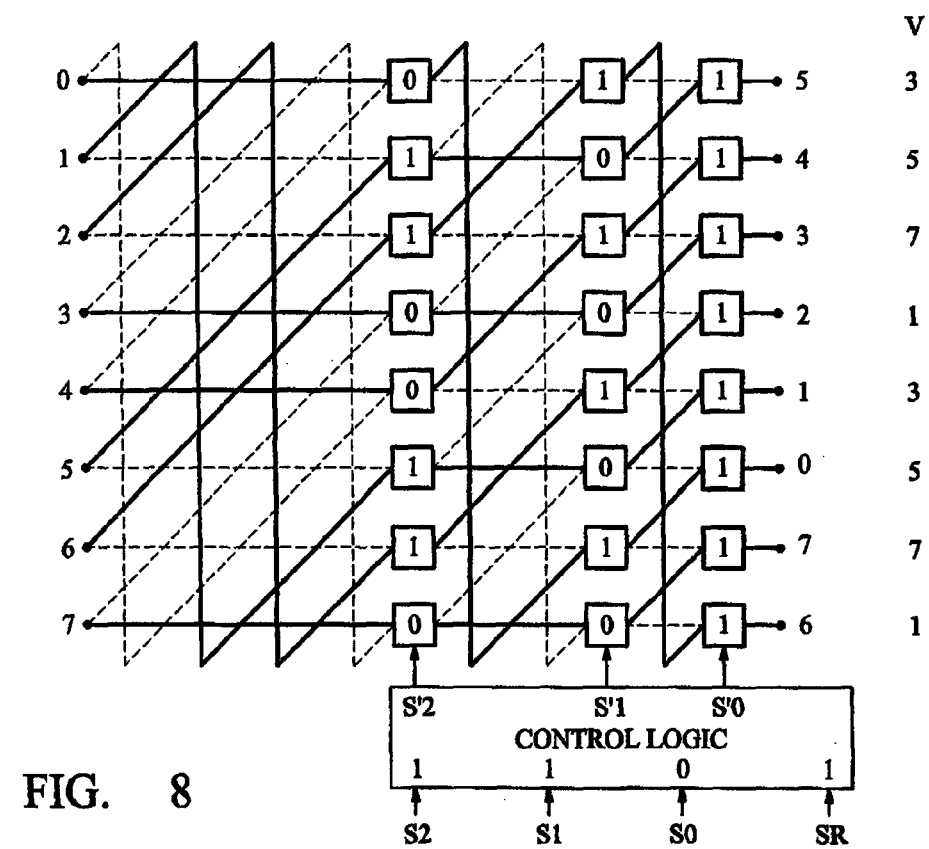
FIG. 8 illustrates the array of FIG. 6 when configured to effect a 6-bit rotate and a reverse.

FIGS. 7 and 8 show the 8-bit arrangement of FIG. 6 when configured not just to effect a reversal, but rather to effect a rotation and a reversal. In particular, FIG. 7 illustrates a rotation by 1 bit and a reversal, while FIG. 8 illustrates a rotation by 6 bits and a reversal. The principles illustrated by these figures can be extended more generally to any rotation of from 1 to 2' bits with a reversal.

In each case the control bit S1 for the final multiplexer bank 104d remains a single bit and is either 0 (FIG. 7) or 1 (FIG. 8) for the whole bank. The control signal for the multiplexer bank 104c defines alternating 0s and 1s. The control signal for the multiplexer bank 104b defines alternating 00s and 11s. For different rotations when combined with a shift, the phasing of the control words S'2 and upwards, and the state of the bit S'1, are appropriately chosen. One way of viewing this is to look at the digital values represented by the 0s and 1s of the control signals along a line of multiplexers, and this is shown on FIGS. 6 to 8 at the right-hand side of each figure in a column headed V.

More generally, control bits S'1 and upwards of increasing significance as applied to each previous set of multiplexers are split into groups, where the number of groups for bank j is given by $2^{j-1}$. Thus for multiplexer bank 104d, $2^{j-1}=2^0=1$, and so there is a single group of control bits which receive logical 0 or logical 1. For multiplexer bank 104c, $2^{j-1}=2^1=2$, and so there are two groups of control bits, which can have logical 0 or logical 1 applied to them. These bits are alternating bits in the word being rotated and so alternate multiplexers have their control inputs wired together. For multiplexer bank 104b, $2^{j-1}=2^0=1$, and so there are 4 groups of control bits applied to pairs of adjacent multiplexers. Each group has its control inputs wired together. The symmetry of this routing method therefore enables the method to be extended to any desired width of rotator.

The values V referred to above represented by the 0s and 1s of the control signals along a line of multiplexers can be enumerated for all of the possible input and required output signals, that is for all possible rotations with a reversal. For the 8-bit situation the values obtained are as follows. The values for a rotation of 1, 1, and 6 bits are as on FIGS. 6, 7, and 8 respectively.

| Number of bits rotation (SR = 1) (Value of S2, S1, S0) | | | | | | | |
|---|---|---|---|---|---|---|---|
| 0 | 1 | 2 | 3 | 4 | 5 | 6 | 7 |
| 1 | 0 | 7 | 6 | 5 | 4 | 3 | 2 |
| 3 | 2 | 1 | 0 | 7 | 6 | 5 | 4 |

-continued

| Number of bits rotation (SR = 1) (Value of S2, S1, S0) | | | | | | | |
|---|---|---|---|---|---|---|---|
| 0 | 1 | 2 | 3 | 4 | 5 | 6 | 7 |
| 5 | 4 | 3 | 2 | 1 | 0 | 7 | 6 |
| 7 | 6 | 5 | 4 | 3 | 2 | 1 | 0 |
| 1 | 0 | 7 | 6 | 5 | 4 | 3 | 2 |
| 3 | 2 | 1 | 0 | 7 | 6 | 5 | 4 |
| 5 | 4 | 3 | 2 | 1 | 0 | 7 | 6 |
| 7 | 6 | 5 | 4 | 3 | 2 | 1 | 0 |

It is seen that there is a pattern to these values, which can be expressed in many ways. The values can in principle be stored or be calculated on the fly in various ways. They can for example simply be stored in a look-up table addressed by S2,S1,S0 and SR, or they can be hardwired into the circuit using standard logic gates, or they can be calculated by reference to the pattern of values in the table above in any convenient manner using well-known logic synthesis software.

When no rotation is required, SR=0 and S'2,S'1,S'0 equals S2,S1,S0 and is simply the number of bits of rotation required repeated for each multiplexer in a bank, as in a known logarithmic rotator.

The exact encoding of the control signals, including the reverse control bit, will determine if the overall effect of the circuit is equivalent to that of a rotator followed by a reverser or that of a reverser followed by a rotator. In a sense this is a matter of nomenclature: a rotation of I followed by a reversal is the same as a reversal followed by a rotation of $2^n$-i. Similar considerations apply in relation to a left rotation and a right rotation (or a left shift and a right shift).

The design of the logic to deliver the control signals to the multiplexer or gating array is such that the control signals for the gates in the rightmost bank of multiplexers 104d pass through only a single gate, whilst for each of the previous multiplexer banks the signals must pass through an increasing number of gates.

This leads to propagation delays in setting up control signals for the multiplexers through which the signals must pass. The initial propagation delay is proportionate to the number of multiplexers through which data has to flow. This is because more gates are required to derive control signals for multiplexers 104a (in the 16-bit case, or 104b in the 8-bit case) than for multiplexers 104d.

However, by inverting the order of the multiplexers so that the smaller rotations performed by the multiplexers in position 104d are implemented first as data flows through, and the more significant rotations by multiplexers 104a are implemented last, the propagation delay when a rotation and reversal is selected is minimised. This is because the first set of multiplexers will be ready to apply their rotation after a single propagation delay to apply the control inputs to them via a single gate. At the same time as this is happening and data is being propagated through, the control signal circuitry required for subsequent multiplexers can propagate through the logic to derive the appropriate control signals for the various multiplexers. Thus the initial propagation delay can be as little as one propagation delay.

Figure 9:
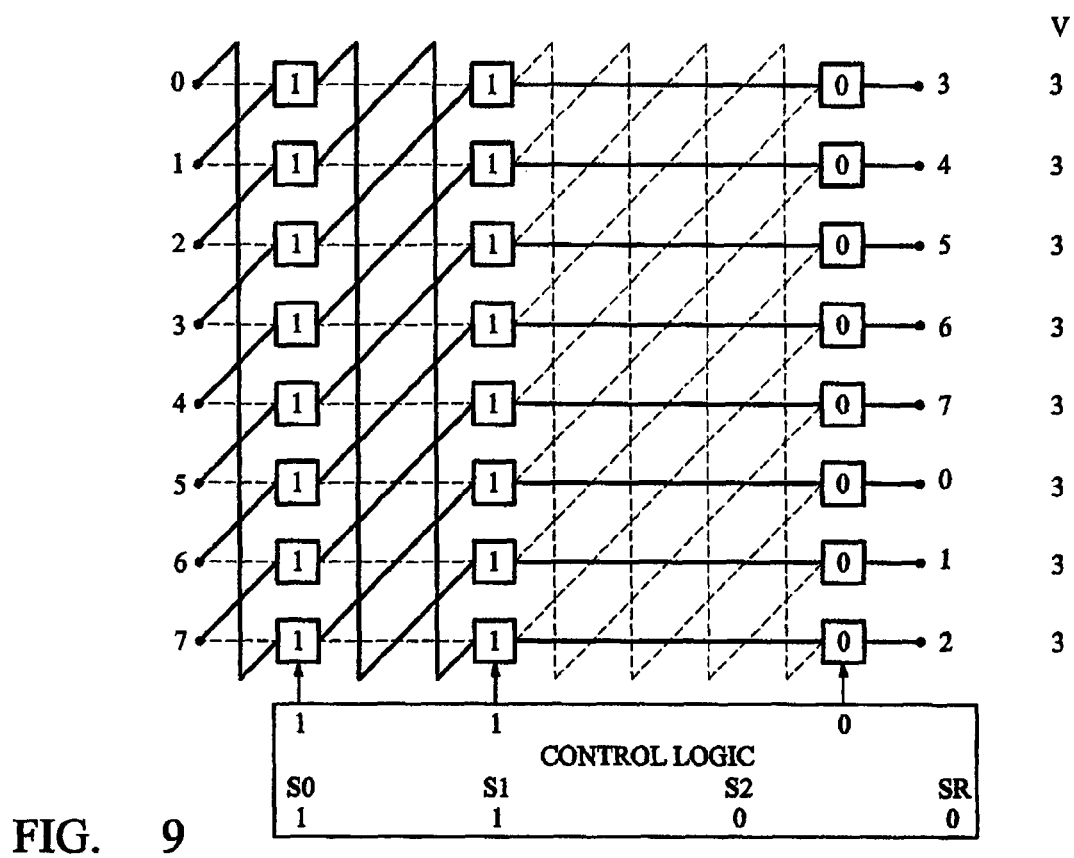
FIG. 9 shows a third rotator/reverser embodying the invention for use with 8-bit signals, when configured to provide a rotation by three bits.
Figure 10:
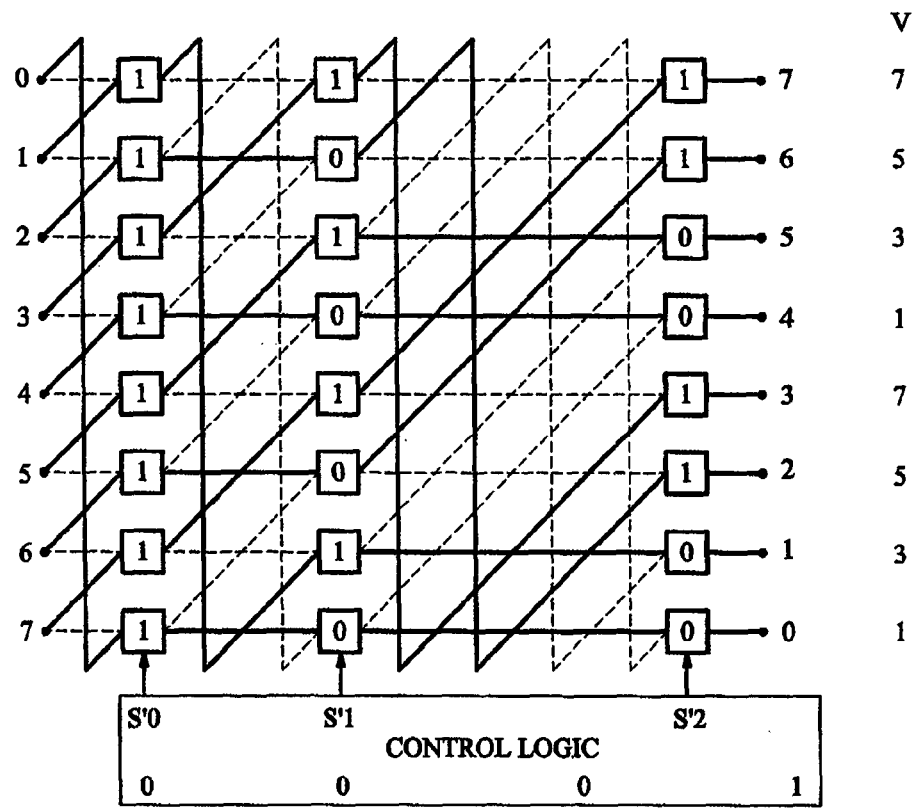
FIG. 10 shows the rotator/reverser of FIG. 9 when providing a reverse with no rotation.

Such an arrangement is shown in FIG. 9. The example of FIG. 9 is configured to effect a rotation by 3 bits, without a reversal, i.e. S2,S1,S0=S'2,S'1,S'0=011 and SR=0. FIG. 10 illustrates a reversal with no rotation, i.e. S2,S1,S0=000 and SR=-1. The values of S'2,S'1,S'0 are shown in FIG. 10.

Figure 11:
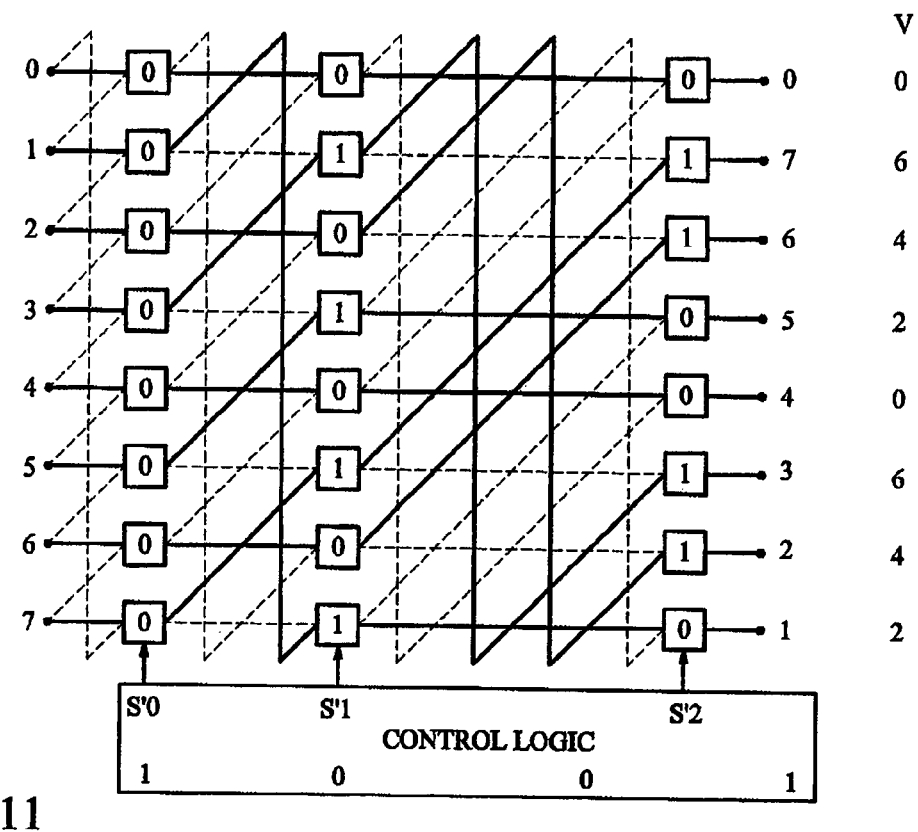
FIGS. 11 to 17 illustrate respectively the arrangement of FIG. 9 when configured to effect a reverse together with 1 to 7 bits of rotation respectively.
Figure 12:
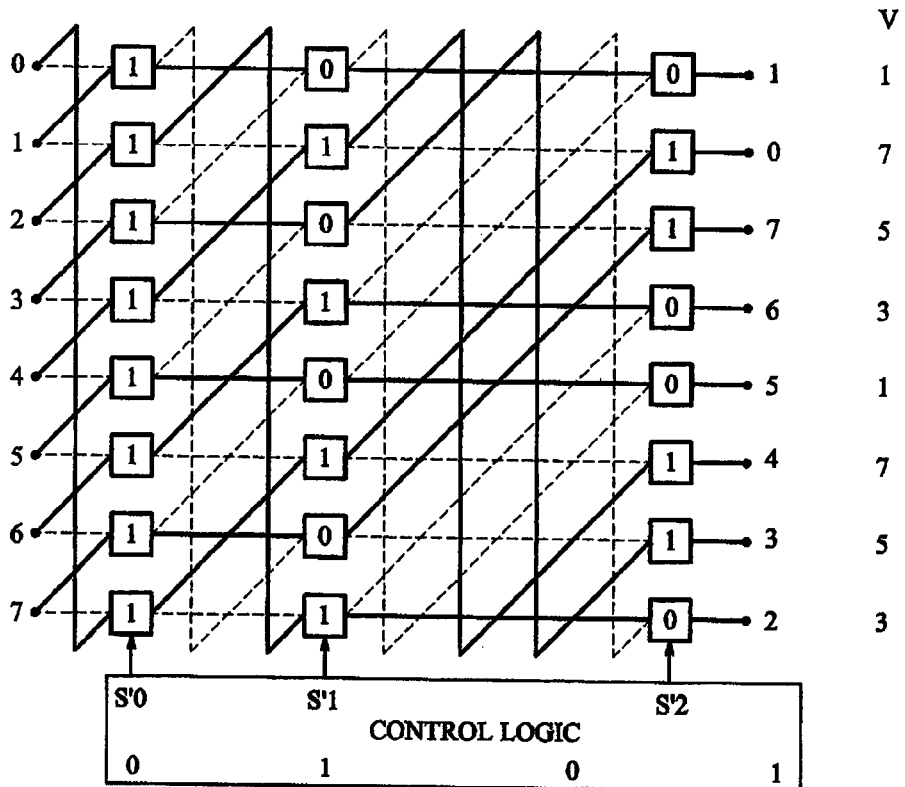
Figure 13:
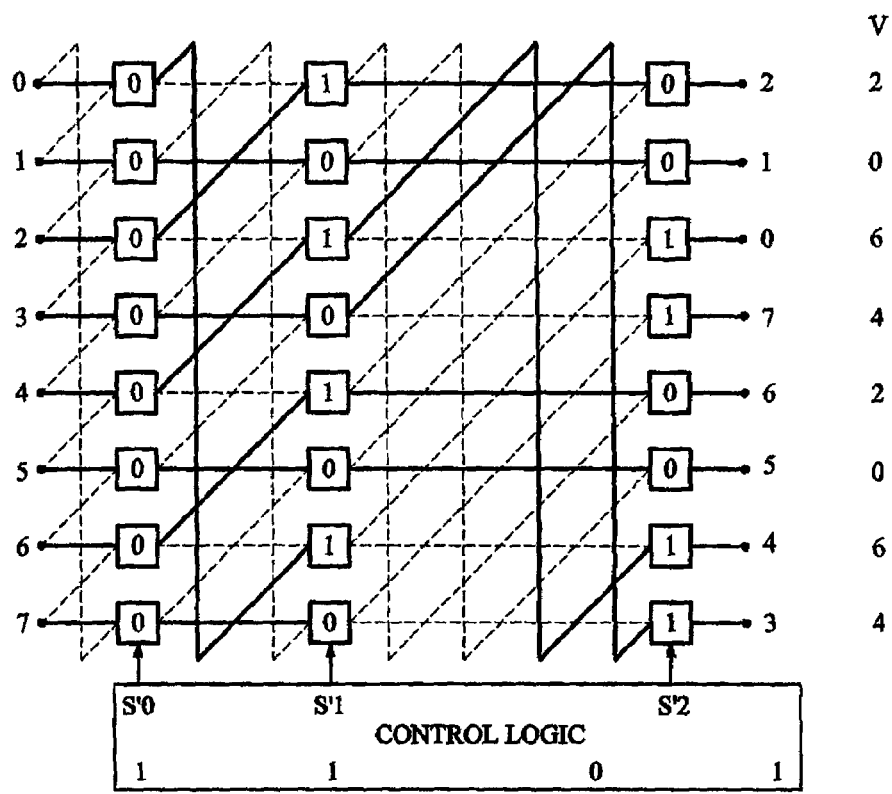
Figure 14:
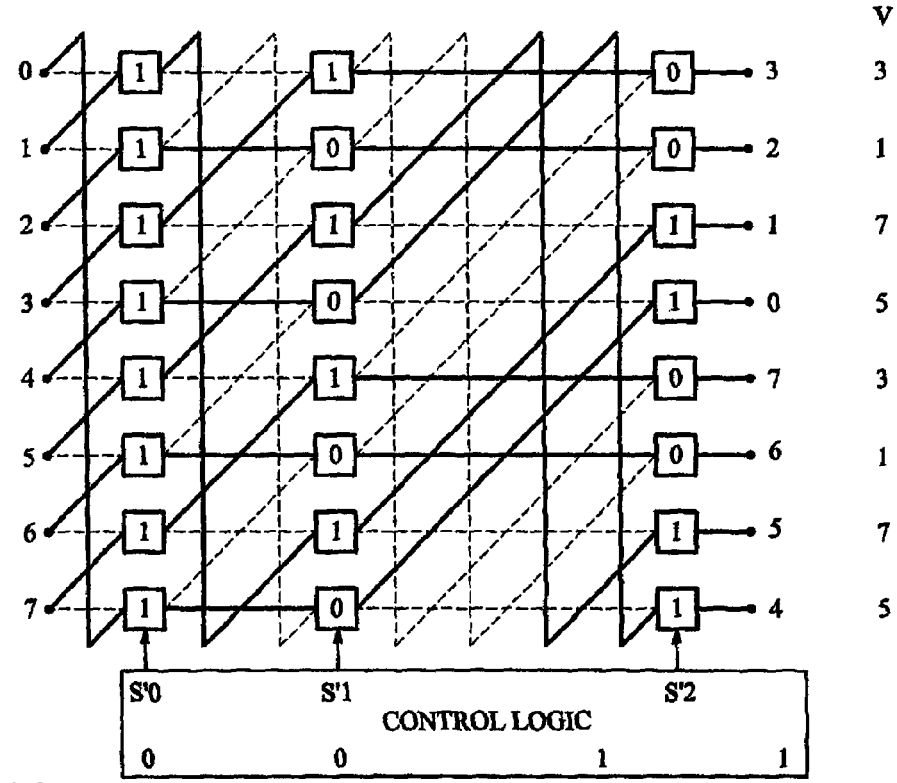
Figure 15:
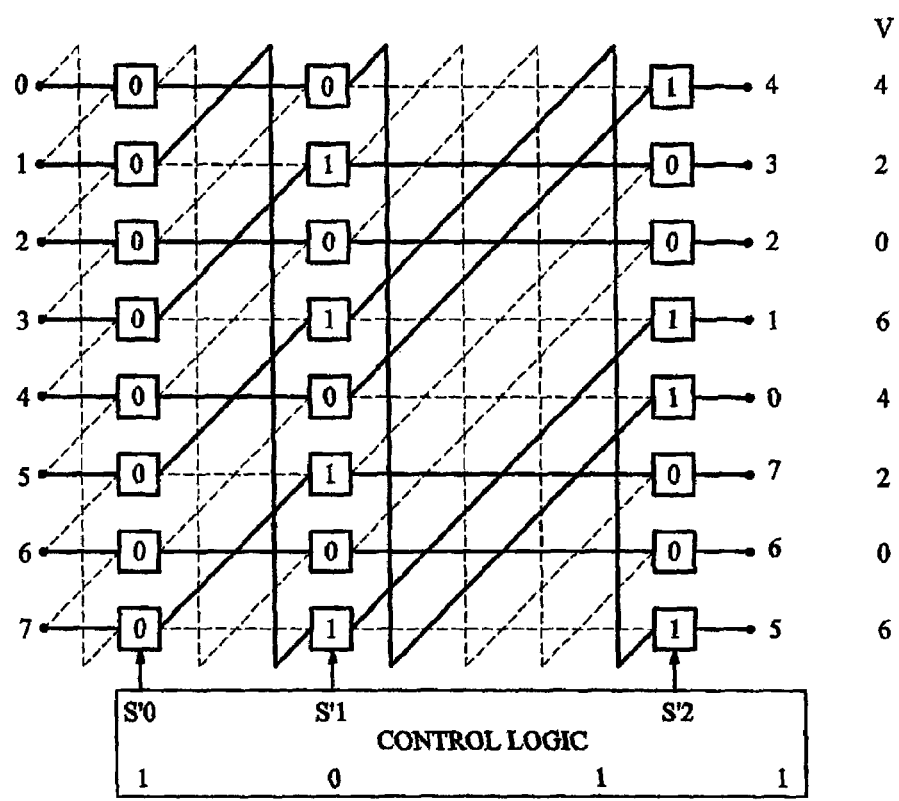
Figure 16:
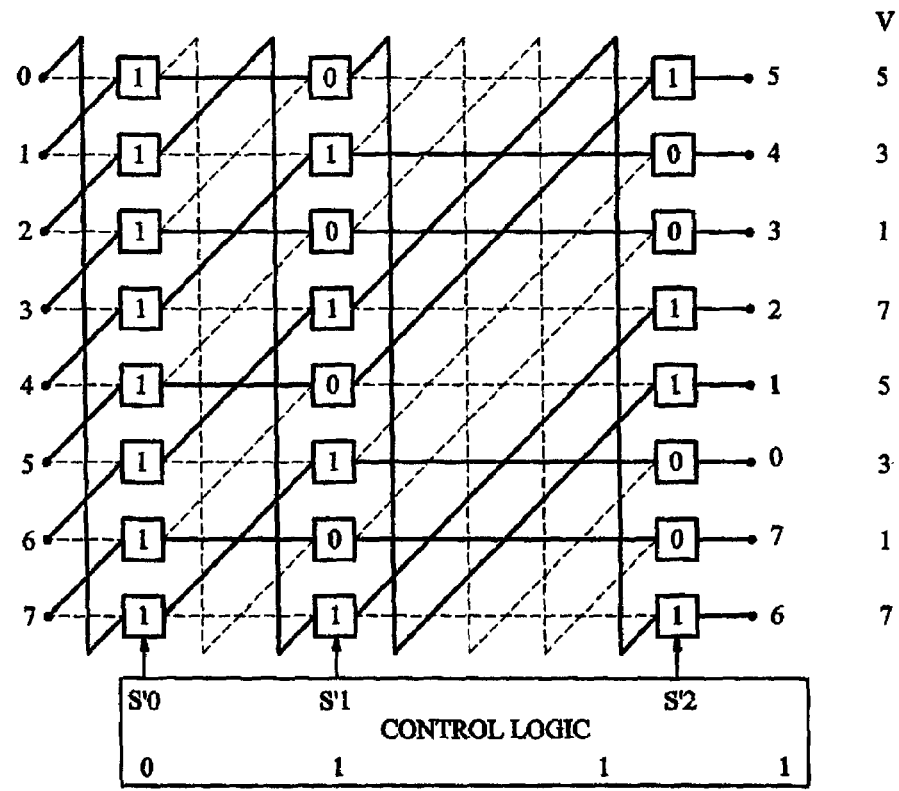
Figure 17:
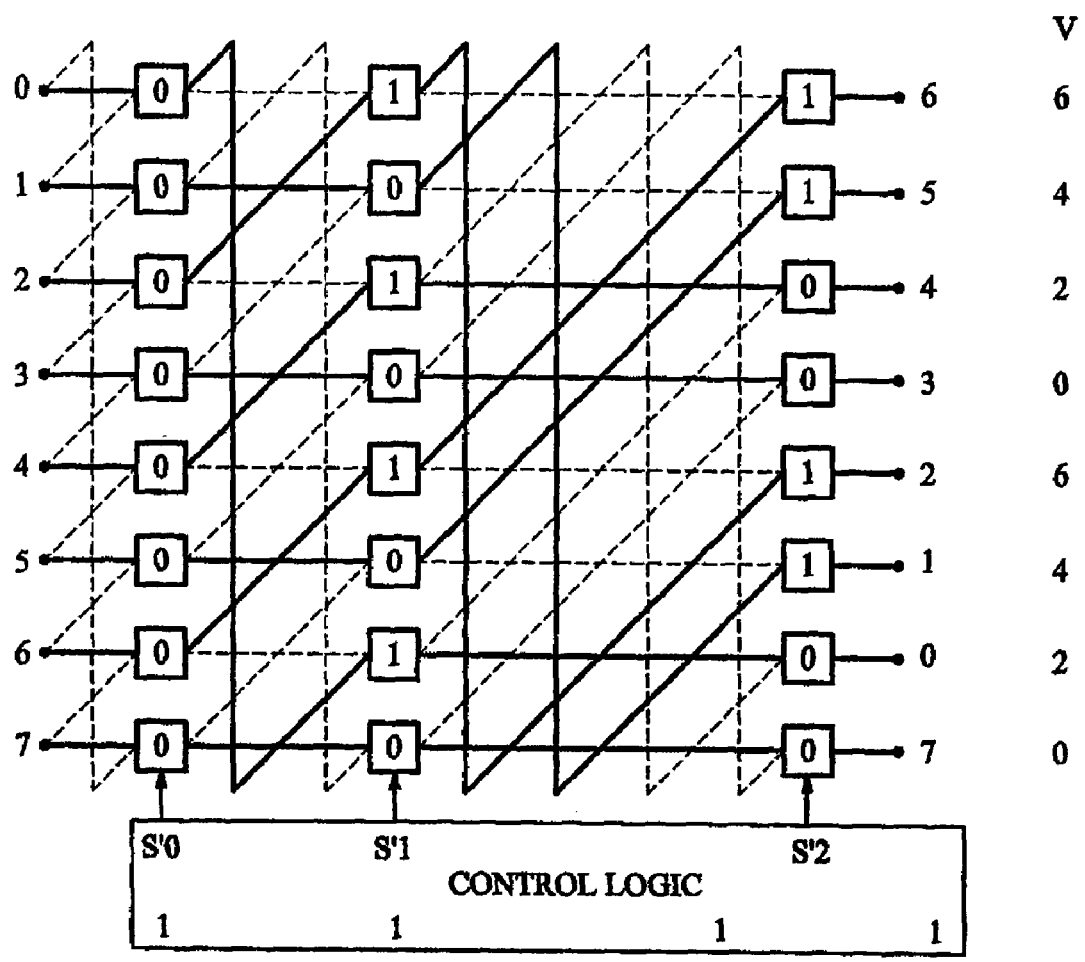

FIGS. 11 to 17 illustrate the arrangement for a reversal combined with 1 to 7 bits of rotation respectively. Again the values of S'2,S'1,S'0 are marked on and apparent from the figures. More particularly:

FIG. 11 shows a reversal combined with a shift of 1 bit.
FIG. 12 shows a reversal combined with a shift of 2 bits.
FIG. 13 shows a reversal combined with a shift of 3 bits.
FIG. 14 shows a reversal combined with a shift of 4 bits.
FIG. 15 shows a reversal combined with a shift of 5 bits.
FIG. 16 shows a reversal combined with a shift of 6 bits.
FIG. 17 shows a reversal combined with a shift of 7 bits.

Having regard to the foregoing description these figures are self-explanatory, and a detailed description of each individual figure is unnecessary for those familiar with the art.

With these arrangements, the entire functionality of a rotation combined with an optional bit reversal can be implemented with the same propagation delay as would be encountered for a rotation alone. Thus, when implemented on a semiconductor chip, while the additional cost in manipulating the control signals incurs some area cost in providing the control signals to the multiplexers, nevertheless the additional delay is minimised on the main data path. This is normally a beneficial approach in processor architecture.

The order of the multiplexer banks could be different from either of the above-described arrangements. Other multiplexer connection patterns could be used, provided that the logarithmic pattern 4, 2, 1, appears in some way, not necessarily in a descending or ascending order. As shown a 2:1 multiplexer arrangement is employed (a 1:2 gate arrangement is in principle an alternative possibility). For example the structure of the multiplexer array of U.S. Pat. No. 6,675,182 could be employed (but not its control logic), with appropriately-derived control signals. In general the array should have at least $2^n$×n two-position gate elements including n banks each of $2^n$ gate elements, and an input and an output each of at least $2^n$ bits. Each gate element needs a control input, and three independent signal terminals with at least one input and one output. Groups of the gate elements of at least all but one of the n banks of gate elements should be separately controllable to the extent described above. The successive banks are connected in cascade with the gate elements of each bank being connected to those bits of either a neighbouring bank or the input or output of the array that are spaced in the direction along the bank by powers of two, where the powers of two are different for the different banks.

Figure 18:
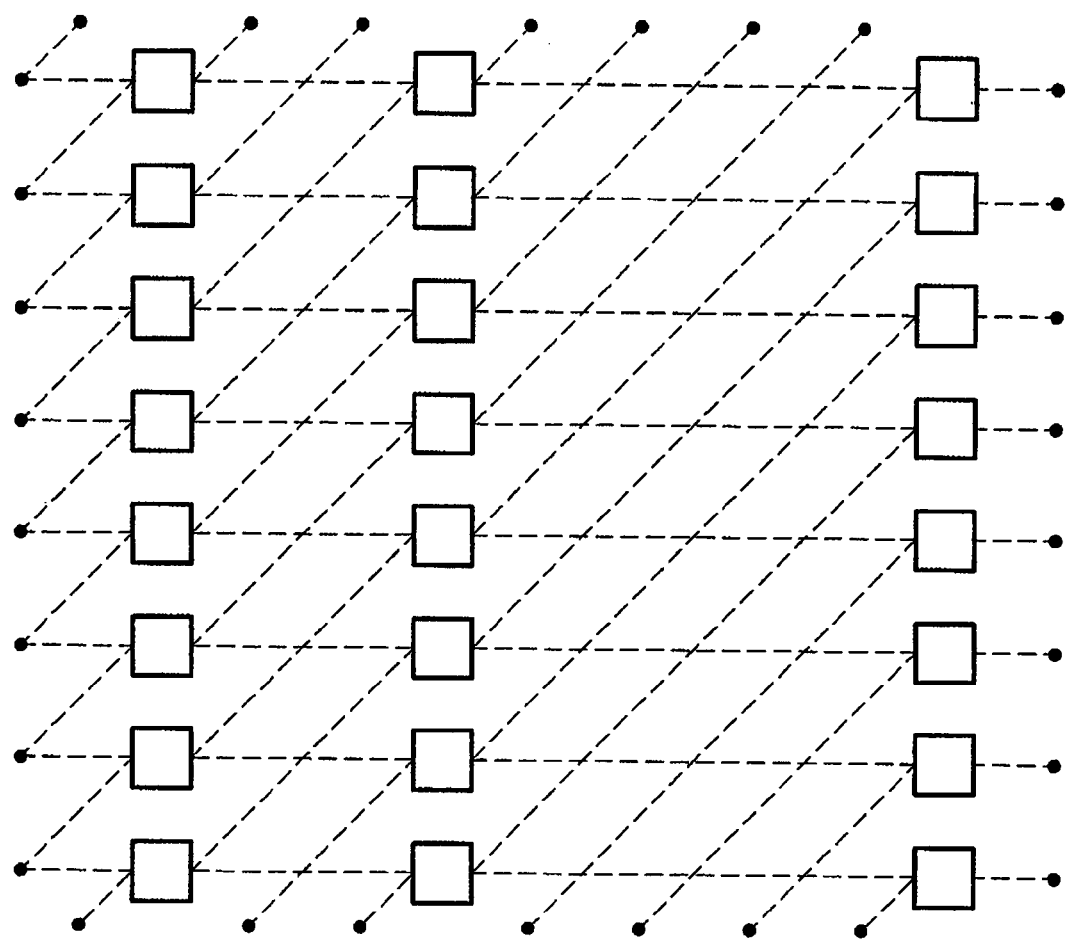
FIG. 18 illustrates a shifter/reverser embodying the invention based on the rotator/reverser of FIG. 9.

Whilst the above discussion has related to the function of rotating the bits of an input data word, it will be appreciated that the circuitry needed to perform the functions of arithmetic or logical shift are closely related to the rotator described. For example by ignoring the bits passing on and off the top and bottom of the multiplexer array a logical shift function is realised instead of a rotate. An example of such a shift circuit is given in FIG. 18, which shows how a rotator/reverser as in FIG. 9 can be adapted to a shifter/reverser. The structure of FIG. 18 is the same as FIG. 9 but with the wrap-around lines (the vertical lines on FIG. 9) omitted. In all other respects the circuit is the same as FIG. 9.

Figure 19:
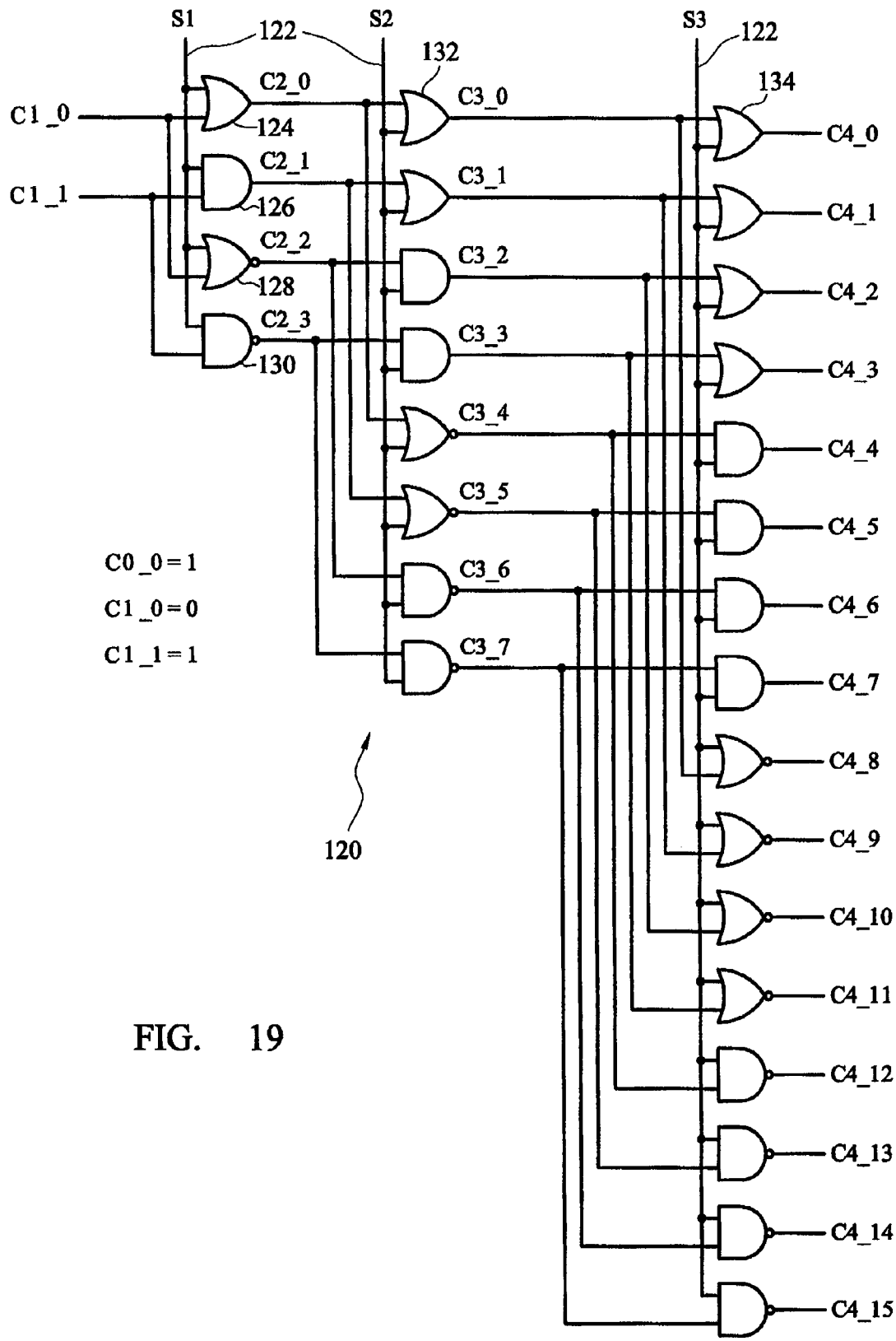
FIG. 19 shows part of the control logic that can be used in the embodiments of the invention.

The preferred manner in which the control bits are derived in the control logic 108 will now be described with reference to FIG. 19 to 21. The arrangement 120 of gates shown in FIG. 19 is designed for use with 32-bit input words where there are five multiplexer banks and five control bits S0, S1, S2, S3 and S4. Such a rotator/reverser is a straight-forward extension of the 16-bit and 8-bit rotator/reversers illustrated but is not shown due to its relative complexity. Considering first the control bits S1, S2 and S3, these are received at inputs 122 shown at the top of the figure. Four gates are connected to receive S1, eight gates are connected to receive S2, and sixteen gates are connected to receive S3. Thus, the arrangement 120 as shown is for use with a 32-bit rotator/reverser array. Four types of gates are used. For example, considering input S1, it is first connected to an OR gate 124, then an AND gate 126, a NOR gate 128, and a NAND gate 130. The gates are represented by conventional symbols, and the same symbols are used for the same type of gate across the whole figure. The circuit makes use of intermediate control signals C. Gate 124 and gate 128 receive a constant C1_0 and gate 126 and gate 130 receive a constant C1_1. The value of C1_0 is 0 and the value of C1_1 is 1, as noted on the figure. The four gates 124, 126, 128 and 130 produce outputs referred to as C2_0, C2_1, C2_2, and C2_3, respectively.

These four signals then proceed to further gates shown as the bank of gates 132. Here the format is somewhat similar to gates 124 to 130, except that there are now two gates of each type. This will be readily apparent from the figure. The bank of gates 132 produces outputs C3_0 to C3_7 respectively.

These eight signals are then applied to a further sixteen set of gates which again are like the gates 124 to 130 except that there are now four gates of each type. This bank of gates 134 produces sixteen outputs C4_0 to C4_15.

The truth table of each of the four gates types is entirely conventional. It will be appreciated in each bank of gates the bottom half of the bank is, in fact, a repetition of the top half of the bank, but with the output inverted. This could be achieved by separate inverters, but by having a duplicate set of gates no additional propagation delay is needed for the inverter operation.

Figure 20:
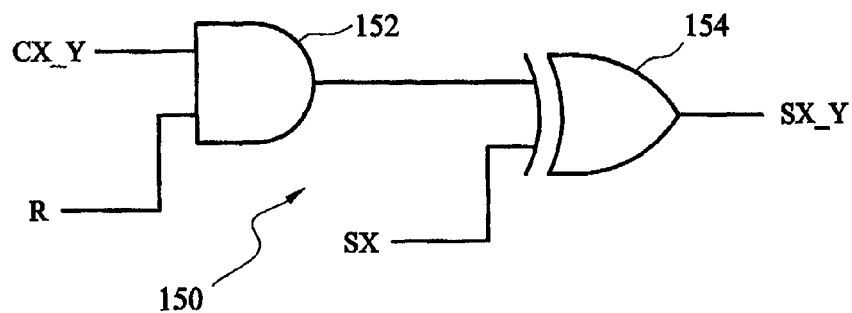
FIG. 20 shows a circuit used in conjunction with each of the outputs of the circuit of FIG. 19.

Each of the intermediate control bit outputs of FIG. 19, namely C2_0 to C4_15, is applied to an array 150 of the type shown in FIG. 20. Thus the array 150 is replicated an appropriate number of times, namely equal to the number of control bits required. These are:
for an 8-bit data word, 7 bits
for a 16-bit data word, 15 bits
for a 32-bit data word, 31 bits.

Figure 21:
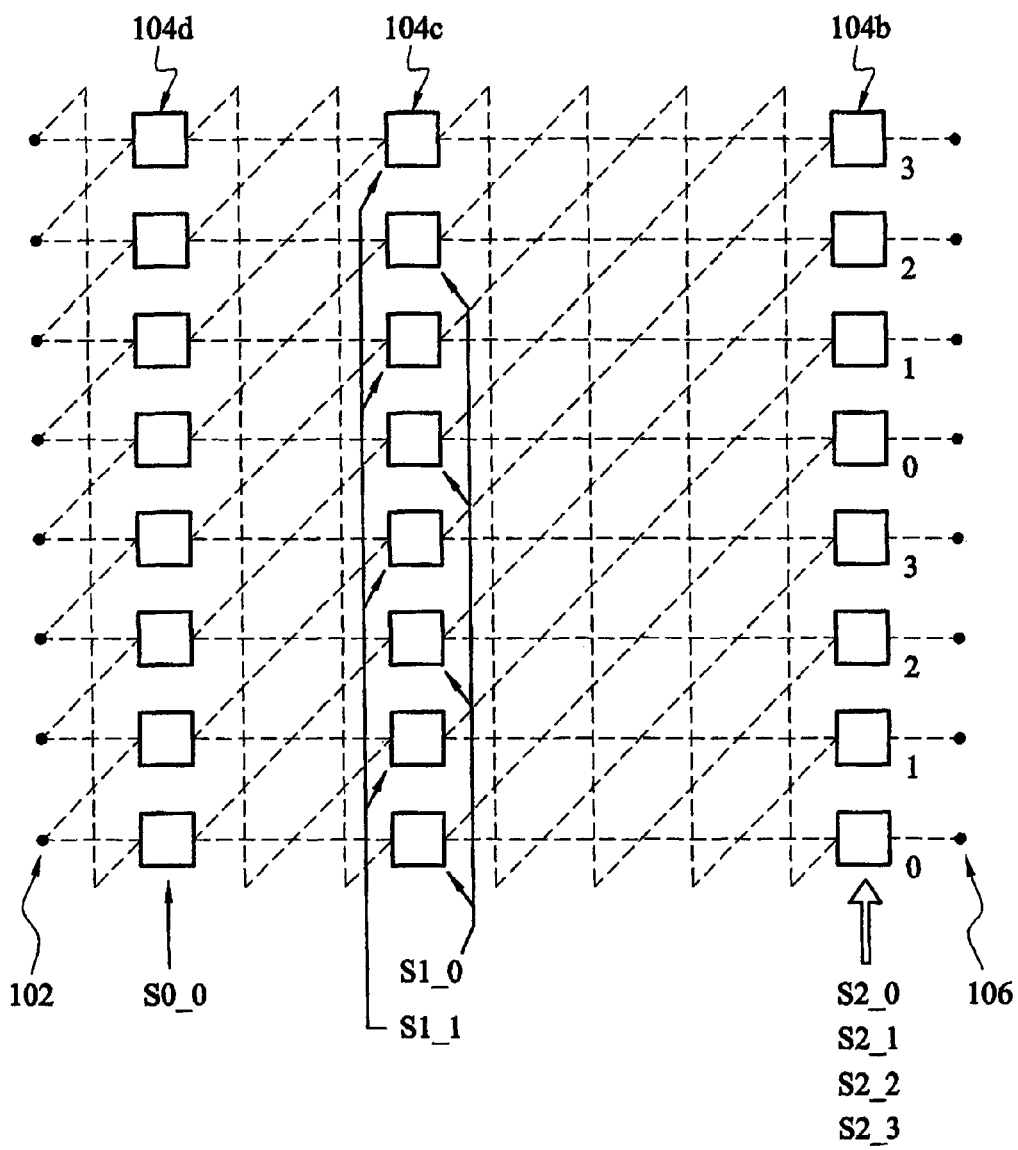
FIG. 21 shows how the outputs of the circuits of FIG. 20 are applied to an array of the type shown in FIG. 9.

The seven bits required for the 8-bit arrangement are shown on FIG. 21 and are seen to be S0_0, S1_0, S1_1, S2_0, S2_1, S2_2 and S2_3. For 16-bit data there will also be control bits S3_0 to S3_7, and for 32-bit data there will additionally be control bits S4_0 to S4_15.

Each array 150 consists of an AND gate 152 and an exclusive-OR or XOR gate 154. One input of the AND gate 152 is one of the signals of the form CX_Y from FIG. 19 and the other input is the reverse control bit SR. Thus when no reversal is required SR=0 and the CX_Y signals have no effect since they are blocked by the AND gate 152. The inputs of the exclusive-OR gate 154 are the output of gate 152 and the control bit SX corresponding to which CX_Y is input to gate 152. The output of gate 154 is a control bit SX_Y.

Thus it will be seen from FIGS. 19 and 20 that the control signals for at least one of the bank of gates—in fact for three out of the five banks of a 32-bit array—are generated by at least one OR gate 124 (FIG. 19) and at least one AND gate 126 coupled to receive both the digit S1 and a respective other signal, which for gates 124,126 is C1_0 and C1_1 respectively. The output of each gate 124,126 is generated in both non-inverted and inverted form, here by the use of additional or duplicate gates 128,130. Each of these outputs is applied to a respective exclusive-OR gate 154 (FIG. 20) which also receives the adjacent and next most significant digit S2 of the input control word which indicates the required amount of rotation. In fact each of three outputs is applied to the respective exclusive-OR gate 154 through an AND gate 152, which also receives the digit SR which indicates whether a reversal is required or not. If not, S2 is used directly as the output, as in the prior art rotator.

The manner in which the control bits SX_Y are applied to the array is illustrated in FIG. 21. This shows a rotator/reverser for an 8-bit input and thus there are three multiplexer banks. The first multiplexer bank 104d receives an input S0_0. This is derived from a separate circuit of the type shown in FIG. 20, where the input CX_Y is a constant C0_0, equal to 1. The second multiplexer bank 104c receives two control bits S1_0 and S1_1, which are applied to alternate gates in the bank as shown. These are also derived from respective separate circuits of the type shown in FIG. 20, where the inputs CX_Y are the constants C1_0, equal to 0, and C1_1, equal to 1, respectively. The third multiplexer bank 104b receives four control bits S2_0, S2_1, S2_2 and S2_3 and these are applied to gates that are eight bits apart. The control signal received by each of these gates is indicated by the numeral adjacent to it.

When no reversal is required, there is no output from AND gate 152, as noted above, and thus SX is applied through XOR gate 154 and becomes SX_Y for all values of Y. This situation pertains when no reversal is required, and the rotator/reverser operates as a pure rotator as with a known logarithmic rotator.

When a reversal is required, AND gate 152 is opened (SR=1) and the intermediate control bits CX_Y are applied as the second input to XOR gate 154. Here they are XORed with the control bit SX, where SX is S0, S1, S2, S3 or S4 as appropriate. This structure then gives the 31 necessary control bits SX_Y required by a 32-bit rotator/reverser, as can be verified empirically.

It will be seen that bit S0 is only used in a single array 150 of the form shown in FIG. 20 and does not need to be input to FIG. 19. Likewise, S4 does not need to be input to FIG. 19 but is applied only to the 16 arrays 150 required to produce the control bits S4_0 to S4_15. That is to say the circuit of FIG. 19 does not need to process the most significant and the least significant control bit, but only the control bits intermediate them. With a 16-bit data word, the gates 134 are omitted, and with an 8-bit data word the gates 132 and 134 are omitted.

It will therefore be appreciated that using a method embodying the invention enables a significant improvement in performance to be achieved in implementing both a digital electronic rotate (or shift) and reverse at the same time as compared with the separate rotate (or shift) and reverse circuits commonly used in processor architecture.

It will therefore be appreciated that using a method embodying the invention enables a significant improvement in performance to be achieved in implementing both a digital electronic rotation (or shift) and reversal at the same time as compared with the separate rotation (or shift) and reversal circuits commonly used in processor architecture.

The invention claimed is:

1. A digital electronic binary rotator or shifter, and reverser, for rotating or shifting, and reversing, bits of a $2^n$ bit binary data word comprising:
   an array of at least $2^n \times n$ two-position gate elements including n banks each of $2^n$ elements, the array having an input for receiving a $2^n$ bit binary data word and an output each of at least $2^n$ bits, each gate element having a control input and three independent signal terminals with two inputs and one output, groups of the gate elements of at least all but one of the n banks of the gate elements being separately controllable, successive banks being connected in cascade with the gate elements of each bank being connected to those bits of either a neighbouring bank or the input or output of the array that are spaced in the direction along the bank by powers of two, the powers of two being different for the different banks;

a control input for receiving a first signal comprising an n-bit word indicating an amount of desired rotation or shift and a second signal indicating a desired reversal or non-reversal; and a control logic coupled to the control input for, when both a rotation or shift and a reversal are simultaneously desired, generating from the first and second signals control signals for applying to the gate elements of the array the control signals having control words for each bank of the gate elements, whereby the gate elements of at least all but one of the n banks of the gate elements are separately controlled, and for applying the control signals in the control words to the control inputs of the gate elements in each respective bank of the array, wherein the control logic generates the control signals from the first and second signals such that the gate elements of the $2^n \times n$ array operate simultaneously to apply the desired rotation or shift determined by the first signal to the bits of the input binary data word and to reverse or non-reverse the bits as determined by the second signal.

2. The apparatus according to claim 1, wherein the gate elements of each bank are connected to receive those input bits or those output bits from the preceding bank that are spaced in the input or the preceding bank by successive powers of two with the powers of two increasing from the input to the output of the array.

3. The apparatus according to claim 1, wherein the control logic generates the control signals from the first and second signals such that the gate elements operate simultaneously to apply the desired rotation or shift determined by the first signal to the bits of the input binary data word, and reverse or non-reverse the bits as determined by the second signal, in the sense that the desired rotation or shift is followed by a reversal.

4. The apparatus according to claim 1, wherein the control logic generates the control signals from the first and second signals such that the gate elements operate simultaneously to apply the desired rotation or shift determined by the first signal to the bits of the input binary data word, and reverse or non-reverse the bits as determined by the second signal, in the sense that a reversal is followed by the desired rotation or shift.

5. The apparatus according to claim 1, wherein for a bank j of the n banks there are $2^{j-1}$ separately-controllable groups of the gate elements.

6. The apparatus according to claim 1, wherein the control logic for generating the control signals for at least one bank of the gate elements comprises at least one AND gate coupled to receive both a digit of the first signal and a respective third signal, means for generating the output of each gate in both non-inverted and inverted form, and a respective exclusive-OR gate being coupled to receive each output and also an adjacent one of the digits of the first signal to provide one of the control signals.

7. The apparatus according to claim 6, wherein the respective exclusive-OR gate receives a respective one of the outputs through a second AND gate which also receives the second signal.

8. The apparatus according to claim 1, wherein each of the two-position gate elements includes a multiplexer.

9. An integrated circuit incorporating a digital electronic binary rotator or shifter, and reverser, for rotating or shifting, and reversing, bits of a $2^n$ bit binary data word which comprises:

an array of at least $2^n \times n$ two-position gate elements including n banks each of $2^n$ gate elements, the array having an input for receiving a $2^n$ bit binary data word and an output each of at least $2^n$ bits, each gate element having a control input and three independent signal terminals with two inputs and one output, groups of the gate elements of at least all but one of the n banks of the gate elements being separately controllable, successive banks being connected in cascade with the gate elements of each bank being connected to those bits of either a neighbouring bank or the input or output of the array that are spaced in the direction along the bank by powers of two, the powers of two being different for the different banks;

a control input for receiving first signal comprising an n-bit word indicating an amount of desired rotation or shift and a second signal indicating a desired reversal or non-reversal; and a control logic coupled to the control input for, when both a rotation or shift and a reversal are simultaneously desired, generating from the first and second signals control signals for applying to the gate elements of the array the control signal having control words for each bank of the gate elements, whereby the gate elements of at least all but one of the n banks of the gate elements are separately controlled, and for applying the control signals in the control words to the control inputs of the gate elements in each respective bank of the array, wherein the control logic generates the control signals from the first and second signals such that the gate elements of the $2^n \times n$ array operate simultaneously to apply the desired rotation or shift determined by the first signal to the bits of the input binary data word and to reverse or non-reverse the bits as determined by the second signal.

10. A computer readable storage medium with a program carrier carrying a computer program which executes the following steps:

receiving a $2^n$ bit binary data word;

applying the bits to an array of at least $2^n \times n$ two-position gate elements including n banks each of $2^n$ gate elements, the array having an input and an output each of at least $2^n$ bits, each gate element having a control input and three independent signal terminals with two inputs and one output, groups of the gate elements of at least all but one of the n banks of the gate elements being separately controllable, successive banks being connected in cascade with the gate elements of each bank being connected to those bits of either a neighbouring bank or the input or output of the array that are spaced in the direction along the bank by powers of two, the powers of two being different for the different banks;

receiving a first signal comprising an n-bit word indicating an amount of desired rotation or shift and a second signal indicating a desired reversal or non-reversal;

when a rotation or shift and a reversal are simultaneously desired, generating from the first and second signals control signals for applying to the gate elements of the array the control signals having control words for each bank of the gate elements, whereby the gate elements of at least all but one of the n banks of the gate elements can be separately controlled; and applying the control signals in the control words to the control inputs of the gate elements in each respective bank of the array, wherein the controls signals are generated from the first and second signals such that the gate elements of the $2^n \times n$ array operate simultaneously to apply the desired rotation or shift determined by the first signal to the bits of the input binary data word and to reverse or non-reverse the bits as determined by the second signal.

11. A method of reversing bits of a binary data word, comprising the steps of:
applying the bits to a logarithmic rotator having a plurality of multiplexers, each of the multiplexers having a control input, the multiplexers being arranged in banks; and
applying control signals to the control inputs of the multiplexers in the logarithmic rotator in order to cause the multiplexers both to reverse input bits and to apply a rotation to the multiplexers,
wherein the control signals for at least one bank of the multiplexers are generated by at least one OR gate and at least one AND gate coupled to receive both a digit of a first signal and a respective third signal, and an output of each gate is generated in both non-inverted form and inverted form, each output being applied to a respective exclusive-OR gate which also receives an adjacent one of the digits of the first signal to provide one of the control signals.

12. The method according to claim 11, wherein each of the outputs of the gates is applied to the respective exclusive-OR gate through a second AND gate which also receives a second signal.

13. A method according to claim 11 further comprising the steps of:
receiving a $2^n$ bit binary data word;
applying the bits to an array of at least $2^n \times n$ two-position gate elements including n banks each of $2^n$ gate elements, the array having an input and an output each of at least $2^n$ bits, each gate element having a control input and three independent signal terminals with at least one two inputs and one output, groups of the gate elements of at least all but one of the n banks of the gate elements being separately controllable, successive banks being connected in cascade with the gate elements of each bank being connected to those bits of either a neighbouring bank or the input or output of the array that are spaced in the direction along the bank by powers of two, the power of two being different for the different banks;
receiving a first signal comprising an n-bit word indicating an amount of desired rotation or shift and a second signal indicating a desired reversal or non-reversal;
when both a rotation or shift and a reversal are simultaneously desired, generating from the first and the second signals control signals for applying to the gate elements of the array the control signals having control words for each bank of the gate elements, whereby the gate elements of at least all but one of the n banks of the gate elements can be separately controlled; and
applying the control signals in the control words to the control inputs of the gate elements in each respective bank of the array,
wherein the control signals are generated from the first and second signals such that the gate elements of the $2^n \times n$ array operate simultaneously to apply the desired rotation or shift determined by the first signal to the bits of the input binary data word and to reverse or non-reverse the bits as determined by the second signal.

14. The method according to claim 13, wherein the gate elements of each bank are connected to receive those input bits or those output bits from the preceding bank that are spaced in the input or the preceding bank by successive powers of two with the powers of two increasing from the input to the output of the array.

15. The method according to claim 13, wherein the control signals are generated from the first and second signals such that the gate elements operate simultaneously to apply the desired rotation or shift determined by the first signal to the bits of the input binary data word, and reverse or non-reverse the bits as determined by the second signal, in the sense that the desired rotation or shift is followed by a reversal.

16. The method according to claim 13, wherein the control signals are generated from the first and second signals such that the gate elements operate simultaneously to apply the desired rotation or shift determined by the first signal to the bits of the input binary data word, and reverse or non-reverse the bits as determined by the second signal, in the sense that a reversal is followed by the desired rotation or shift.

17. The method according to claim 13, wherein for a bank j of the n banks there are $2^{j-1}$ separately-controllable groups of the gate elements.

18. The method according to claim 13, wherein the control signals for at least one bank of the gate elements are generated by at least one OR gate and at least one AND gate coupled to receive both a digit of the first signal and a respective third signal, and an output of each gate is generated in both non-inverted and inverted form, each output being applied to a respective exclusive-OR gate which also receives an adjacent one of the digits of the first signal to provide one of the control signals.

19. The method according to claim 18, wherein each of the outputs of the gates is applied to the respective exclusive-OR gate through a second AND gate which also receives a second signal.

20. A digital electronic binary rotator or shifter, and reverser, for rotating or shifting, and reversing, bits of a $2^n$ bit binary data word comprising:
an array of at least $2^n \times n$ two-position gate elements including n banks each of $2^n$ elements, the array having an input for receiving a $2^n$ bit binary data word and an output each of at least $2^n$ bits, each gate element having a control input and three independent signal terminals with two inputs and one output, groups of the gate elements of at least all but one of the n banks of the gate elements being separately controllable, successive banks being connected in cascade with the gate elements of each bank being connected to those bits of either a neighbouring bank or the input or output of the array that are spaced in the direction along the bank by powers of two, the powers of two being different for the different banks;
a control input for receiving a first signal comprising an n-bit word indicating an amount of desired rotation or shift and a second signal indicating a desired reversal or non-reversal; and
a control logic coupled to the control input for, when both a rotation or shift and a reversal are simultaneously desired, generating from the first and second signals control signals for applying to the gate elements of the array the control signals having control words for each bank of the gate elements, whereby the gate elements of at least all but one of the n banks of the gate elements are separately controlled, and for applying the control signals in the control words to the control inputs of the gate elements in each respective bank of the array,
wherein the control logic generates the control signals from the first and second signals such that the gate elements of the $2^n \times n$ array operate simultaneously to apply the desired rotation or shift determined by the first signal to the bits of the input binary data word and to reverse or non-reverse the bits as determined by the second signal, and for a bank j of the n banks there are $2^{j-1}$ separately-controllable groups of the gate elements.

21. A method of reversing bits of a binary data word, the method comprising the steps of:

applying the bits to a logarithmic rotator having a plurality of multiplexers, each of the multiplexers having a control input, the multiplexers being arranged in banks;

applying control signals to the control inputs of the multiplexers in the logarithmic rotator in order to cause the multiplexers both to reverse input bits and to apply a rotation to the multiplexers;

receiving a $2^n$ bit binary data word;

applying the bits to an array of at least $2^n \times n$ two-position gate elements including n banks each of $2^n$ gate elements, the array having an input and an output each of at least $2^n$ bits, each gate element having a control input and three independent signal terminals with two inputs and one output, groups of the gate elements of at least all but one of the n banks of the gate elements being separately controllable, successive banks being connected in cascade with the gate elements of each bank being connected to those bits of either a neighbouring bank or the input or output of the array that are spaced in the direction along the bank by powers of two, the power of two being different for the different banks;

receiving a first signal comprising an n-bit word indicating an amount of desired rotation or shift and a second signal indicating a desired reversal or non-reversal;

when both a rotation or shift and a reversal are simultaneously desired, generating from the first and the second signals control signals for applying to the gate elements of the array the control signals having control words for each bank of the gate elements, whereby the gate elements of at least all but one of the n banks of the gate elements can be separately controlled; and applying the control signals in the control words to the control inputs of the gate elements in each respective bank of the array, wherein the control signals are generated from the first and second signals such that the gate elements of the $2^n \times n$ array operate simultaneously to apply the desired rotation or shift determined by the first signal to the bits of the input binary data word and to reverse or non-reverse the bits as determined by the second signal, and for a bank j of the n banks there are $2^{j-1}$ separately-controllable groups of the gate elements.

* * * * *